June 7, 1960     J. R. BEDFORD, JR     2,939,504
TIRE PRESSURE MAINTAINING MEANS Filed Jan. 16, 1959     2 Sheets-Sheet 1

INVENTOR.
JAMES R. BEDFORD, JR.
BY
McMorrow, Berman & Davidson
ATTORNEYS.

June 7, 1960 J. R. BEDFORD, JR 2,939,504
TIRE PRESSURE MAINTAINING MEANS
Filed Jan. 16, 1959 2 Sheets-Sheet 2
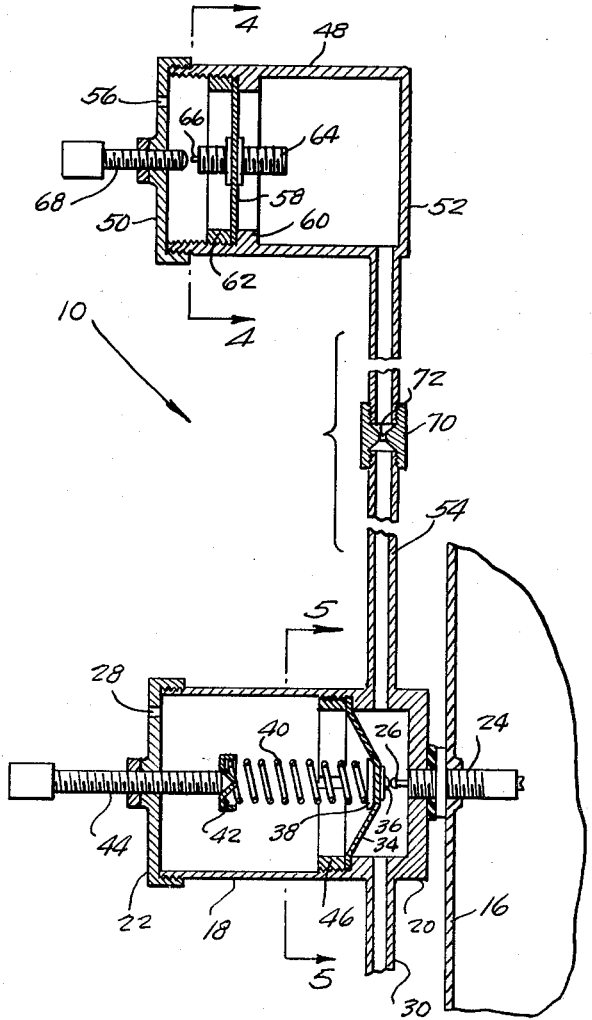
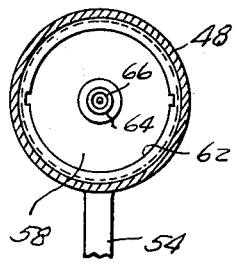
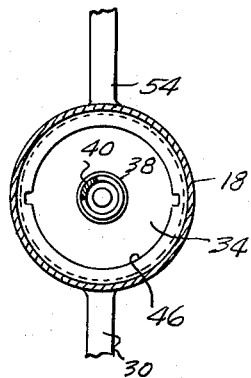
INVENTOR.
JAMES R. BEDFORD, JR.
BY
McMorrow, Berman + Davidson
ATTORNEYS

United States Patent Office 2,939,504
Patented June 7, 1960

2,939,504

TIRE PRESSURE MAINTAINING MEANS

James R. Bedford, Jr., Del Rio, Tex.;
(1310 Porter Road, Nashville 6, Tenn.)

Filed Jan. 16, 1959, Ser. No. 787,283

3 Claims. (Cl. 152—418)

The present invention relates to vehicle tires generally and in particular to a tire pressure maintaining means.

An object of the present invention is to provide means for maintaining the pressure in a tire of a vehicle within preset limits.

Another object of the present invention is to provide means for maintaining the pressure in a vehicle tire which is automatic in operation, requiring little or no attention and one having a unitary structure mounted upon the rim of each vehicle wheel.

A further object of the present invention is to provide means for maintaining the pressure in a vehicle tire at a predetermined pressure which lends itself to ready attachment to and detachment from the rim of a vehicle wheel, one which when attached to the vehicle wheel imparts an attractive appearance to the vehicle wheel replacing the conventional hub cap, and one when installed upon a vehicle wheel has its operating mechanism entirely concealed from view.

A still further object of the present invention is to provide a tire pressure maintaining means which is simple in structure, one having few moving parts easily replaced and requiring little or no maintenance, and one which is economically feasible.

These and other objects and advantages of the present invention will be fully apparent from the following description when taken in conjunction with the annexed drawings, in which:

Figure 3 is a sectional view of the regulating means as seen on the line 3—3 of Figure 2;

Figure 4 is a view taken on the line 4—4 of Figure 3; and

Figure 5 is a view taken on the line 5—5 of Figure 3.

Figure 1:
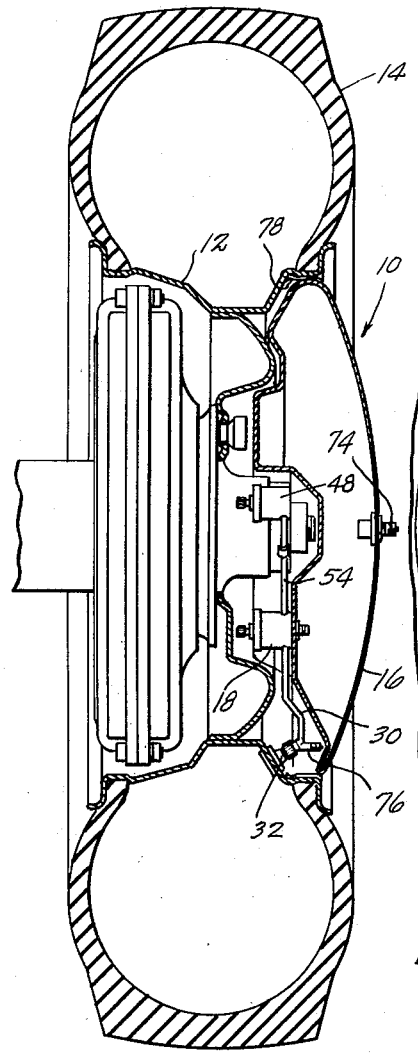
Figure 1 is a sectional view through a vehicle rim and tire showing the tire pressure maintaining means of the present invention installed thereon.
Figure 2:
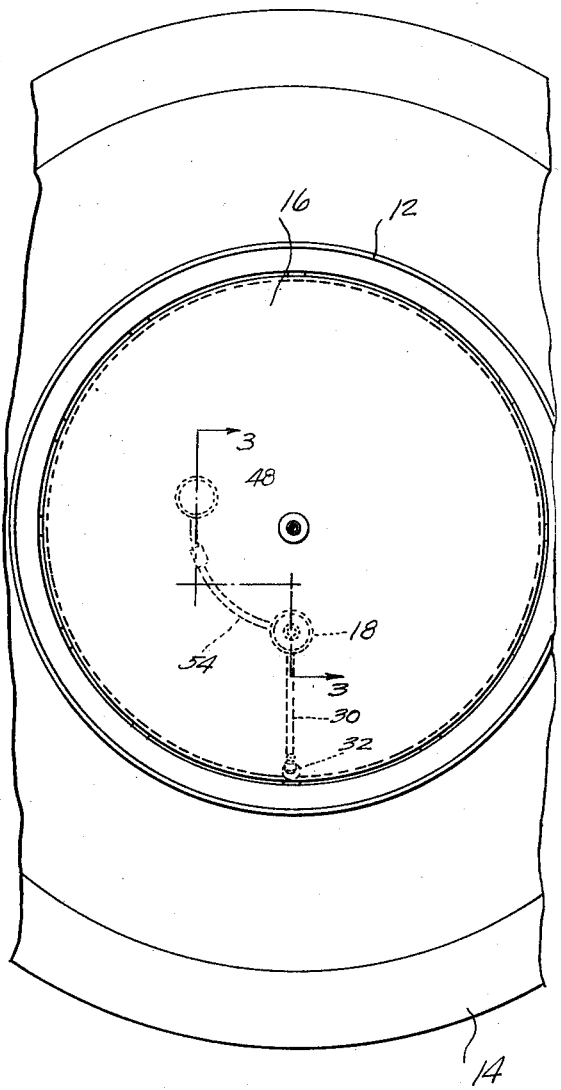
Figure 2 is a view in elevation of the assembly shown in Figure 1 with portions of the tire broken away, the dotted line shown indicating the pressure regulating means according to the present invention.

Referring in greater detail to the drawings in which like numerals indicate like parts throughout the several views, the tire pressure maintaining means according to the present invention is designated generally by the reference numeral 10 in Figures 1 and 3. The reference numeral 12 designates the rim of a vehicle wheel with a tire 14 carried thereby.

The tire pressure maintaining means 10 comprises a tank 16 conformably shaped to fit within the rim 12 adjacent the tire 14 and being substantially oval in cross-sectional configuration. The tank 16 is adapted to contain a supply of air under pressure.

A casing 18 having closed ends 20 and 22 is positioned exteriorly of the tank 16 and is supported upon an end portion of a nipple 24 which extends into the tank 16. The nipple 24 extends through the one end 20 of the casing 18 and has within it a normally closed valve of the type available commercially and known as a Schrader valve. The valve actuating stem projects outwardly of the nipple 24 and is designated in Figure 3 by the numeral 26. The cap which forms the closed end 22 of the casing 18 is provided with a vent 28 connecting the adjacent end of the casing 18 with the atmosphere.

A conduit 30 has one end connected in communication with the interior of the casing 18 adjacent the end 20 and has its other end connected in communication with the interior of the tire 14 by means of an inlet structure 32.

A diaphragm 34 extends transversely across the casing 18 inwardly of and spaced from the adjacent end of the conduit 30. The central portion of the diaphragm 34 carries a button 36 on one side and a cup element 38 on the other side. A coil spring 40 has one end seated in the cup element 38 and its other end seated in an annular support 42 carried on the free end of a bolt 44 which is threaded through the cap which forms the closed end 22 of the casing 18. The spring 40 urges the diaphragm 34 toward the closed end 20 of the casing 18. A ring 46 threadedly engaged on the interior wall of the casing 18 secures the diaphragm 34 in its position inwardly of and spaced from the conduit 30.

Pressure relief means is provided operatively connected to the portion of the casing 18 between the diaphragm 34 and the casing closed end 20 and is operable upon an increase in pressure in the casing portion to discharge air from the casing portion to the atmosphere. Specifically, this pressure relief means embodies a housing 48 having closed ends 50 and 52. The housing 48 is positioned exteriorly of and is supported by the tank by means of a conduit 54 connecting the end 52 of the housing 48 with the portion of the casing 18 adjacent the closed end 20.

The cap which closes the end 50 of the housing 48 is provided with a vent 56 connecting the adjacent portion of the housing 48 with the atmosphere.

A diaphragm 58 extends transversely across the housing 48 intermediate the ends and is movable toward the housing end 50 responsive to an increase in pressure in the conduit 54. The diaphragm 58 is supported between a shoulder 60 and a ring 62 threadedly engaged on the inner wall of the adjacent portion of the housing 48. A nipple 64 is arranged axially of the housing 48 and is carried by the diaphragm 58. An end portion of the nipple 64 projects towards the cap which forms the closed end 50 of the housing 48 and the stem of another valve, as at 26 in Figure 3, projects out of the nipple one end toward the closed end 50 of the housing 48. The valve within the nipple 64 is also of the type known as a Schrader valve.

A bolt 68 is threadedly engaged in the cap which forms the closed end 50 of the housing 48 and has a free end portion projecting inwardly of the closed end of the housing 48 and forming an abutment for the end portion of the stem 66. The bolt 68 is adjustably movable toward and away from the diaphragm 58 by manually rotating the same.

The conduit 54 is fabricated in two parts connected at their abutting ends by a coupling member 70 having a restricted passage 72 therethrough.

The central portion of the outside face of the tank 16 is provided with an air inlet valve 74 of conventional construction for the admission thereinto of a charge of air under pressure.

Another air inlet valve 76 is incorporated in the coupling connecting the conduit 30 with the inlet structure 32 of the tire 14.

In operation, the tire pressure maintaining means of the present invention is employed with each rim and tire of the vehicle or such rims and tires as are desired to be protected against under inflation and over inflation.

The tank 16 is attached to the rim 12 of the wheel with which it is to be employed by suitable gripping means as at 78 in Figure 1 engaging an exterior dish portion of the rim 12. The tank 16 is positioned in place after the inlet structure 32 has been connected to the adjacent end of the conduit 30. A supply of air under pressure is now admitted through the air inlet valve 74 to the interior of the tank 16. The compression forces of the spring 40 will hold the diaphragm 34 in the position in which the button 36 depresses the stem 26 of the valve within the nipple 24, thus permitting air to flow from the interior of the tank 16 into the adjacent end of the casing 18 and into the tire 14 through the conduit 30. Air also flows from the end portion of the casing 18 through the conduit 54 and the passage 72 into the one end portion of the housing 48.

The compression forces of the spring 40 are adjusted by rotating the bolt 44 manually so as to extend the bolt 44 inwardly or outwardly of the casing 18 to a point at which the button 36 is disengaged from the free end of the stem 26 when a preset pressure has been attained within the tire 14. The bolt 68 is also adjusted inwardly or outwardly so that the stem 66 of the valve within the nipple 64 is free of engagement with the bolt 68 when the pressure in the tire 14 is at the predetermined and desired pressure.

Upon overheating of the tire or increase of pressure of the air within the tire 14 for any other reason, the diaphragm 58 will move toward the cap which forms the closure for the closed end 50 of the housing 48 and the bolt 68 will engage the stem 66 to release air through the nipple 64 to the vent 56 and thence to atmosphere. This bleeding of the pressure from the tire 14 will be at a slow rate due to the restricted passage 72 in the conduit 54.

Upon loss of air from the tire 14 for any reason such as a slow leak, the diaphragm 34 will move toward the closed end 20 of the casing 18 under the influence of the spring 40 and the button 36 will engage the free end of the stem 26 of the valve within the nipple 24 and will release air from the tank 16 into the adjacent end portion of the casing 18 and thence into the tire 14 through the conduit 30 until the preset and desired pressure within the tire 14 is again attained.

It will be seen, therefore, that the tire pressure maintaining means of the present invention enables a vehicle operator to have the tires of the vehicle inflated at a desired pressure from the supply of air within the tank 16 with any excess pressure being bled off through the relief means within the housing 48. The tires 14 of the vehicle will be protected against damage due to a slow deflation caused by slow leaks and caused by over-inflation due to overheating or other causes. The tanks 16 may be shaped on their exterior faces to conform to the vehicle contours and may be shaped to resemble hub caps and wheel covers of conventional design if desired.

What is claimed is:

1. The combination with a vehicle rim, and an inflatable tire carried by the rim, of a tire pressure maintaining means comprising a tank adapted to contain a supply of air under pressure mounted on said rim adjacent said tire, a casing having closed ends positioned exteriorly of and supported by said tank with one end adjacent to and spaced from said tank and with the other end remote from said tank, there being a vent in said other end of said casing, a conduit having one end in communication with said casing adjacent said one end and having the other end in communication with said tire, a diaphragm extending transversely across said casing inwardly of and spaced from said conduit one end and movable toward said casing one end responsive to a decrease in pressure in said conduit, a nipple connecting said tank in communication with the interior of said casing through said casing one end, a normally closed valve in said nipple for controlling the flow of air from said tank into said casing and operable to shift said valve into open position upon contact of said diaphragm with said valve upon application of a decrease of pressure imposed upon said diaphragm by the flow of air from said conduit into said casing, and pressure relief means including a diaphragm actuable valve working within a housing operatively connected to the portion of said casing between said diaphragm and said casing one end and operable upon an increase in pressure in said casing portion to discharge air from said casing portion to the atmosphere.

2. The combination with a vehicle rim, and an inflatable tire carried by the rim, of a tire pressure maintaining means comprising a tank adapted to contain a supply of air under pressure mounted on said rim adjacent said tire, a casing having closed ends positioned exteriorly of and supported by said tank with one end adjacent to and spaced from said tank and with the other end remote from said tank, there being a vent in said other end of said casing, a conduit having one end in communication with said casing adjacent said one end and having the other end in communication with said tire, a diaphragm extending transversely across said casing inwardly of and spaced from said conduit one end and movable toward said casing one end responsive to a decrease in pressure in said conduit, a nipple connecting said tank in communication with the interior of said casing through said casing one end, a normally closed valve in said nipple for controlling the flow of air from said tank into said casing and operable to shift said valve into open position upon contact of said diaphragm with said valve upon application of a decrease of pressure imposed upon said diaphragm by the flow of air from said conduit into said casing, and pressure relief means operatively connected to the portion of said casing between said diaphragm and said casing one end and operable upon an increase in pressure in said casing portion to discharge air from said casing portion to the atmosphere, said means embodying a housing having closed ends positioned exteriorly of and supported by said tank, there being a vent in one end of said housing, another conduit having one end connected in communication with said casing one end portion and having the other end connected in communication with the portion of said housing adjacent said other end, a diaphragm extending transversely across said housing intermediate the ends thereof and movable toward said housing one end responsive to an increase in pressure in said another conduit, a nipple arranged axially of said housing and carried by said last-mentioned diaphragm, a normally closed valve in said last-named nipple controlling the flow of air from the portion of said housing adjacent the other end to said vent, and an abutment carried by said housing one end and engageable by said diaphragm when the latter has been moved toward said housing one end and operable to shift said last-named valve to open position responsive upon application of an increase in pressure imposed upon said last-mentioned diaphragm by the flow of air from said casing one end portion into said housing.

3. The combination with a vehicle rim, and an inflatable tire carried by the rim, of a tire pressure maintaining means comprising a tank adapted to contain a supply of air under pressure mounted on said rim adjacent said tire, a casing having closed ends positioned exteriorly of and supported by said tank with one end adjacent to and spaced from said tank and with the other end remote from said tank, there being a vent in said other end of said casing, a conduit having one end in communication with said casing adjacent said one end and having the other end in communication with said tire, a diaphragm extending transversely across said casing inwardly of and spaced from said conduit one end and movable toward said casing one end responsive to a decrease in pressure in said conduit, a nipple connecting said tank in communication with the interior of said casing through said casing one end, a normally closed valve in said nipple for controlling the flow of air from said tank into said casing and operable to shift said valve into open position upon contact of said diaphragm with said valve upon application of a decrease of pressure imposed upon said diaphragm by the flow of air from said conduit into said casing, and pressure relief means operatively connected to the portion of said casing between said diaphragm and said casing one end and operable upon an increase in pressure in said casing portion to discharge air from said casing portion to the atmosphere, said means embodying a housing having closed ends positioned exteriorly of and supported by said tank, there being a vent in one end of said housing, another conduit having one end connected in communication with said casing one end portion and having the other end connected in communication with the portion of said housing adjacent said other end, a diaphragm extending transversely across said housing intermediate the ends thereof and movable toward said housing one end responsive to an increase in pressure in said another conduit, a nipple arranged axially of said housing and carried by said last-mentioned diaphragm, a normally closed valve in said last-named nipple controlling the flow of air from the portion of said housing adjacent the other end to said vent, and an abutment carried by said housing one end and engageable by said diaphragm when the latter has been moved toward said housing one end and operable to shift said last-named valve to open position responsive upon application of an increase in pressure imposed upon said last-mentioned diaphragm by the flow of air from said casing one end portion into said housing, there being a restricted passage formed in said last-named conduit.

References Cited in the file of this patent
UNITED STATES PATENTS

| | | |
|---|---|---|
| 2,141,542 | Mann | Dec. 27, 1938 |
| 2,141,543 | Mann | Dec. 27, 1938 |